Oct. 10, 1950

R. W. INGALLS ET AL 2,525,411

SAW SETTING TOOL

Filed May 21, 1949

INVENTORS
R.W. Ingalls
D.B. Ingalls

BY

ATTORNEYS

Oct. 10, 1950 R. W. INGALLS ET AL 2,525,411
SAW SETTING TOOL

Filed May 21, 1949 2 Sheets-Sheet 2

INVENTORS
R. W. Ingalls
D. B. Ingalls
BY
ATTORNEYS

Patented Oct. 10, 1950

2,525,411

UNITED STATES PATENT OFFICE 2,525,411

SAW SETTING TOOL

Ralph W. Ingalls, Madera, and David B. Ingalls, Chowchilla, Calif.

Application May 21, 1949, Serial No. 94,562

6 Claims. (Cl. 76—67)

1

This invention is directed to, and it is an object to provide, an improved saw setting tool of hand-supported, pistol-grip type.

Another object of the invention is to provide a saw setting tool embodying a novel, snap-action, tooth setting hammer assembly including a spring actuated plunger which is automatically cocked and then released upon relative approaching motion of the spaced depending handles which comprise the hand grip of the tool.

A further object of the invention is to provide a saw setting tool, as above, which is operative to positively set each tooth to the same angle; the tool being constructed so as to accomplish the desired result without any tendency to break teeth when the latter are struck by the forcefully advanced hammer.

An additional object of the invention is to provide a saw setting tool which includes novel locating and supporting mechanism for the saw blade, adjacent the tooth to be set, whereby the resulting set is accurate and the same with respect to all of the saw teeth.

It is also an object of the invention to provide a saw setting tool which is handy and convenient to use, being adapted to function successively merely by corresponding squeezing motions of the hand on the grip.

A further object of the invention is to provide a practical and reliable saw setting tool, and one which will be exceedingly effective for the purpose for which it is designed.

These objects are accomplished by means of such structure and relative arrangement of parts as will fully appear by a perusal of the following specification and claims.

Figure 3:
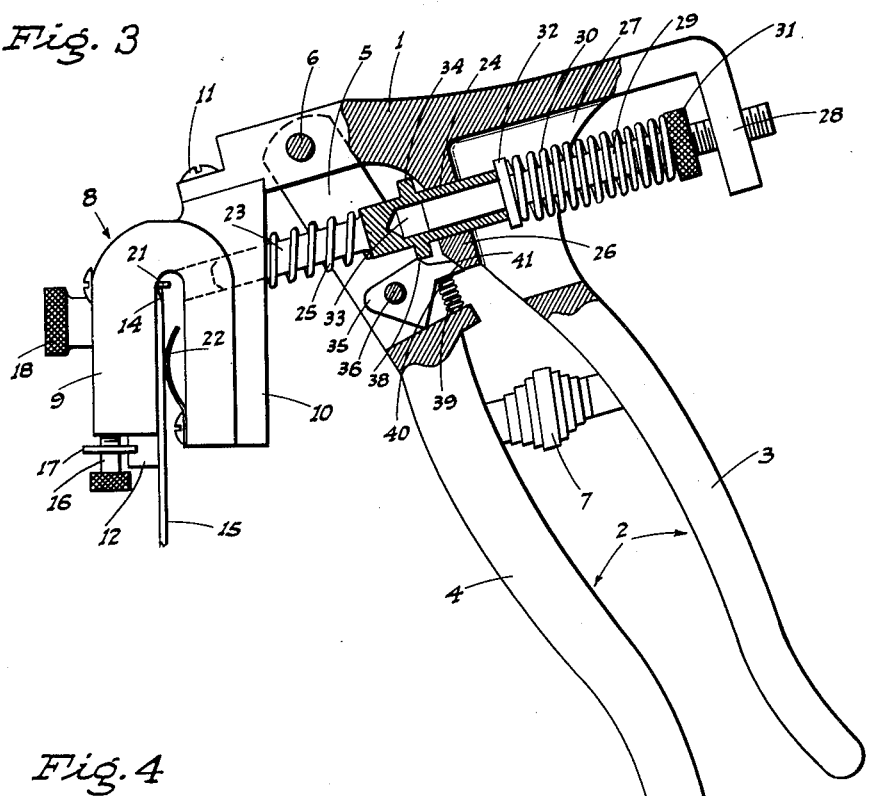
Fig. 3 is a view similar to Fig. 1, but shows the tool with the plunger cocked and the hammer assembly retracted.
Figure 4:
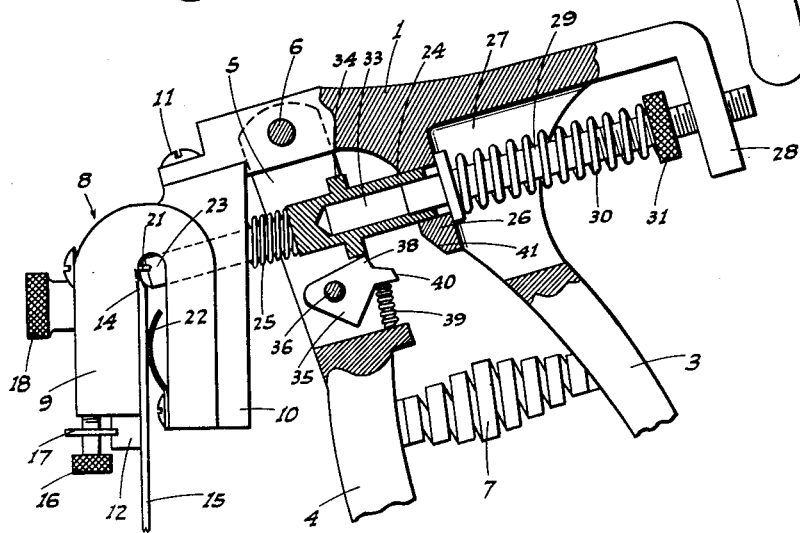

Fig. 4 corresponds to Fig. 3, but shows the plunger as released and the hammer assembly as positively advanced thereby to set a tooth.

Referring now more particularly to the characters of reference on the drawings, the improved pistol-grip type, saw setting tool comprises a rigid longitudinal body 1, from which the grip depends; the grip being indicated generally at 2. The grip 2 includes a rear depending handle 3 fixed in connection with the body 1, and a front depending handle 4, forked at its upper end, as at 5, and pivotally connected to the body 1, as at 6. As so mounted, the front depending handle 4 is swingable rearwardly toward the rear handle 3; such front handle normally being maintained in advanced position by a compression spring 7 engaged between said handles.

At the front end thereof the body 1 is fitted with a depending, saw-locating and supporting mechanism, indicated generally at 8; such mechanism comprising a laterally opening saddle block 9 having a post 10 at the rear thereof which upstands, and is connected with, a mating part of the body by screws 11.

A vertically adjustable anvil 12 runs in a groove formed in the inner face of the front portion or leg of the saddle block; said anvil being formed, at its upper end, with a chamfered rear face 13 corresponding to the angle to which the teeth 14 of a saw 15 are to be set.

Vertical adjustment of the anvil 12 is accomplished by a screw 16 threaded into the lower end of the forward portion of the saddle block 9; such screw including a radial flange 17 which runs in a groove in the lower end portion of the anvil, whereby to raise or lower the latter upon adjustment of said screw.

The anvil 12 is releasably locked in adjusted position by a screw 18 which extends through a slot 19 in the front of the saddle block 9, and is thence threaded into the anvil 12, as shown.

The saddle block 9 is cut away on top throughout a central portion, as at 20, whereby to expose the upper end portion of the anvil 12, including the face 13. It is thus possible for the operator to view the position of each tooth 14 with respect to said face 13.

Laterally of the cutaway portion 20, the saddle block 9 is fitted, within the confines thereof, with tooth stops 21, alined transversely of the saddle block and adapted to function as a means to limit relative upward movement of the saw 15 into the saddle block 9, and in which saddle block the saw is engaged for the purpose of tooth setting.

When so engaged in the saddle block 9, the saw 15 is effectively supported flush against the anvil 12 and the forward portion of the saddle block 9 on opposite sides thereof, by an arcuate leaf spring 22 which is secured to, and upstands from, the rear portion of said saddle block 9 within the latter.

With the above described locating and supporting mechanism the saw 15 can be accurately positioned in the saddle block 9 with each tooth directly alined with the face 13 rearwardly of the latter for setting of such tooth. The setting operation is accomplished by means of the following snap-action, hammer assembly:

A rod-like hammer 23 slidably extends through a bore in the saddle block 9 and post 10; said rod-like hammer being normally retracted, substantially alined with, and adapted to work toward, the face 13 at substantially right angles thereto.

Rearwardly of the post 10 the rod-like hammer 23 is formed integral with the forward end of a plunger 24, and a compression spring 25 between the post 10 and plunger 24 normally maintains the hammer retracted (this being a relatively advanced position of said plunger 24).

At its rear end portion the plunger 24 slidably engages through a transverse abutment 26 in the body 1 directly ahead of a recess 27.

Figure 1:
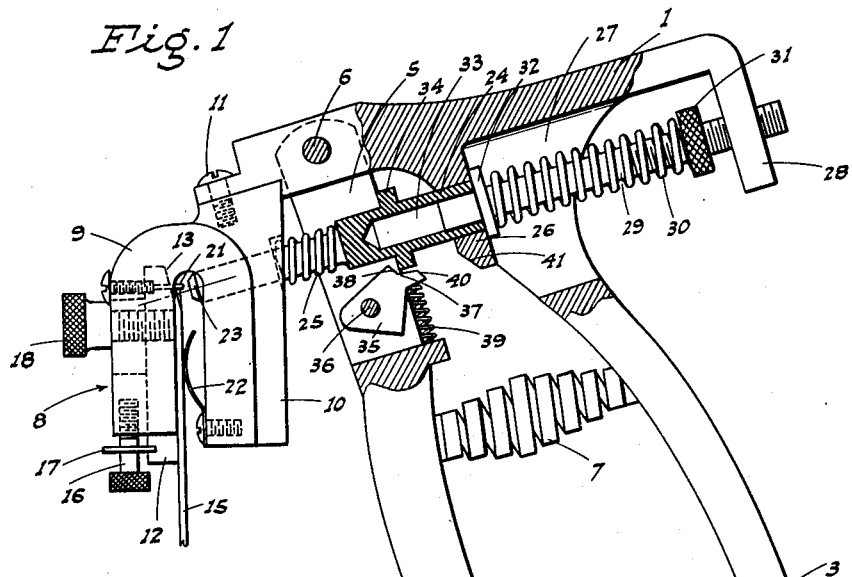
Fig. 1 is a side elevation, mainly in section, showing the tool as in place on a saw, and with the parts of the tool in initial or starting position.
Figure 2:
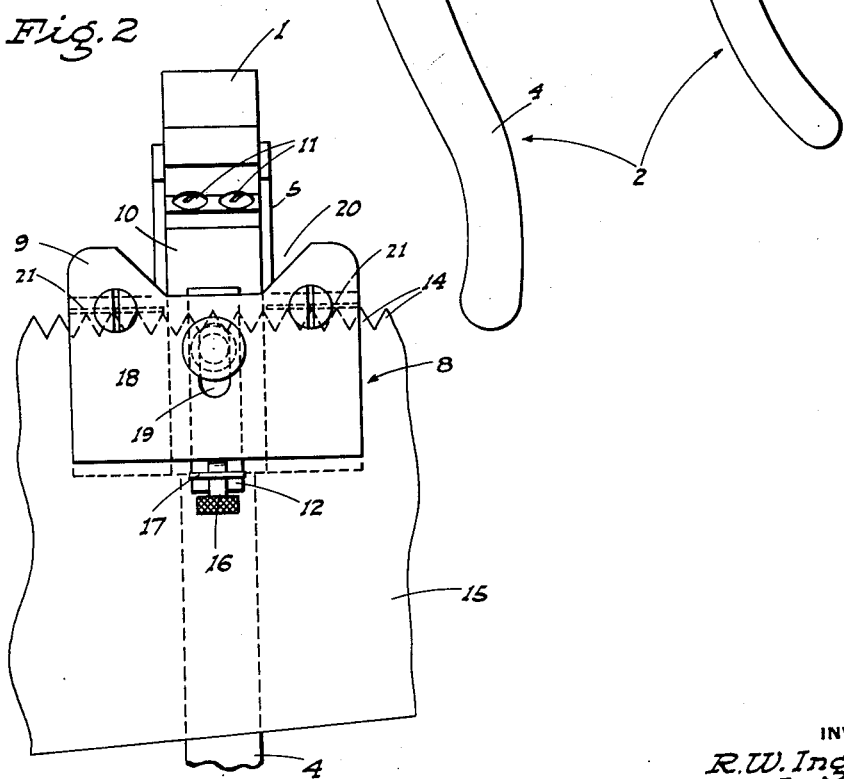
Fig. 2 is a front end view of the tool on a saw.

At its rear end the body 1 includes a depending bracket 28, through which the rear end portion of a forwardly extending rod 29 is threaded. A helical compression spring 30 surrounds the rod 29 within the recess 27 between an adjustable finger nut 31 threaded on the rod and a washer 32 on said rod in engagement with the back side of the abutment 26. The forward end portion of the rod 29 engages in relatively slidable relation in an axial bore 33 in the plunger 24. It will thus be recognized that upon rearward motion of the plunger 24 from its normal position, as in Fig. 1, said plunger pushes the washer 32 rearwardly and materially increases the load of the compression spring 30.

The plunger 24 is formed, intermediate its ends and closely adjacent the fork 5 of the front handle 4, with a radial shoulder 34 adapted to cooperate with a plate-like trigger 35 transversely pivoted, as at 36, in the fork 5 adjacent the lower end of the latter.

The trigger 35 is notched, as at 37, at its upper edge and somewhat rearwardly of the transverse pivot 36, to form a rearwardly facing sear 38.

The trigger 35 is normally maintained in a raised position by a compression spring 39 engaged between the bottom of the fork 5 and a rearward portion of the trigger 35; the sear 38 engaging the radial shoulder 34 of plunger 24 when the trigger 35 is in said raised position.

When the operator engages the grip 2 and squeezes thereon, the front handle 4 is swung rearwardly toward the rear handle 3, with the result that the normally raised trigger 35 carries the plunger 24 rearwardly to what may be termed a cocked position, with relatively great load on the compression spring 30 (see Fig. 3). After predetermined rearward swinging of said front handle 4, as above, a bevel cam face 40 on the rear end of the trigger engages a cooperating bevel cam face 41 on the abutment 26. These cam faces are angled so that when they engage, the trigger 35 is caused to swing downwardly at its rear end, releasing the sear 38 from the radial shoulder 34. When this occurs the loaded compression spring 30 forcefully advances the plunger 24 and hammer 23 with a snap action; the latter striking a forceful blow against the saw tooth then alined in front of the anvil face 13, instantaneously setting said teeth, but without tendency to break the same (see Fig. 4).

It will be noted that hammer 23 is circular and its reduced top end is at right angles to the rod axis, or parallel to the anvil face 13, which in turn is substantially 15° (the conventional tooth angle) to the saw 14 itself. Also, the hammer is positioned so that it initially contacts a tooth adjacent its point. This is an important feature, since it tends to bend the tooth from the base to the point, and thus allowing said tooth to bend for its full length and not at the base alone. Tooth breakage is thus avoided. Further, the hammer being round, it can rotate in the tool, while always keeping the same angle and point of contact with the tooth.

The above described saw setting tool is extremely convenient to use, can be employed to set saw teeth relatively fast, and accomplishes a positive, accurate set on each tooth.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A saw setting tool comprising a body, a first handle fixed rigid with the body and projecting at substantially right angles thereto, a second handle pivoted to the body and normally projecting at substantially right angles thereto and in substantial parallelism with the first handle, yieldable means normally holding the handles in spaced apart relation, a saw locating and holding saddle fixed at the forward end of the body and including an anvil, a hammer slidably mounted through one part of the saddle for engagement with a saw tooth alined with the anvil, a plunger fixed to the hammer and projecting rearwardly therefrom and being slidably mounted through a part of the body, yieldable means interposed between the saddle and plunger and being effective to hold the hammer in normally retracted position relative to the anvil, a normally unloaded compression spring interposed between the rear end of the plunger and a part of the body, trigger means between the pivoted handle and the plunger operative upon swinging of such handle rearwardly to load the compression spring, and means to release the trigger means when the compression spring is loaded to a predetermined degree.

2. A tool as in claim 1 in which the longitudinal axis of the hammer and plunger extends at right angles to the face of the anvil and the end face of the hammer lies parallel with the face of the anvil.

3. A tool as in claim 1 including a pin mounted in the body with its longitudinal axis co-axial with the longitudinal axis of the plunger, the plunger being slidably mounted on the pin.

4. A tool as in claim 1 in which the plunger is rotatable about its longitudinal axis.

5. A tool as in claim 4 in which the trigger means comprises an annular shoulder about the periphery of the shoulder, a trigged pivoted on the pivoted handle, such trigger including a sear, and yieldable means normally holding the sear in engagement with the shoulder when the handles are spread apart.

6. A saw setting tool comprising a body, a first handle fixed rigid with the body and projecting at substantially right angles thereto, a second handle pivoted to the body and normally projecting at substantially right angles thereto and in substantial parallelism with the first handle, yieldable means normally holding the handles in spaced apart relation, a saw locating and holding saddle fixed at the forward end of the body and including an anvil, a hammer slidably mounted through one part of the saddle for engagement with a saw tooth alined with the anvil, a recess formed in the body rearwardly of the pivoted handle, a pin supported in the ends of the recess, a normally unloaded compression spring surrounding the pin, a washer on the pin adjacent one end of the spring, the spring bearing against the washer, a plunger having a central bore in one end receiving one end of the pin, such one end of the plunger engaging the washer, the hammer being secured to the other end of the plunger, and a spring about the hammer and interposed between the saddle and the plunger and being effective to hold the hammer in normally retracted position with respect to the anvil and the plunger in engagement with the washer.

RALPH W. INGALLS.
DAVID B. INGALLS.

REFERENCES CITED

The following references are of record in the file of this patent:

UNITED STATES PATENTS

| Number | Name | Date |
|---|---|---|
| 530,501 | Bernard | Dec. 11, 1894 |
| 977,722 | Falun | Dec. 6, 1910 |
| 1,034,593 | Drager | Aug. 6, 1912 |
| 1,373,308 | Davison | Mar. 29, 1921 |
| 1,844,734 | Wolfe | Feb. 9, 1932 |
| 1,851,773 | Peterson et al. | Mar. 29, 1932 |
| 2,225,141 | Williams | Dec. 17, 1940 |